United States Patent
Tamura et al.

(10) Patent No.: US 10,353,741 B2
(45) Date of Patent: Jul. 16, 2019

(54) LOAD DISTRIBUTION OF WORKFLOW EXECUTION REQUEST AMONG DISTRIBUTED SERVERS

(71) Applicant: FUJITSU LIMITED, Kawasaki-shi, Kanagawa (JP)

(72) Inventors: Kiyoko Tamura, Fuchu (JP); Hiroaki Komine, Yamato (JP); Hirofumi Inokuchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 97 days.

(21) Appl. No.: 15/354,505

(22) Filed: Nov. 17, 2016

(65) Prior Publication Data
US 2017/0161108 A1   Jun. 8, 2017

(30) Foreign Application Priority Data

Dec. 3, 2015 (JP) ................................ 2015-236562

(51) Int. Cl.
*G06F 9/50* (2006.01)
*H04L 29/08* (2006.01)
*G06Q 10/06* (2012.01)

(52) U.S. Cl.
CPC .......... *G06F 9/505* (2013.01); *H04L 67/1008* (2013.01); *G06Q 10/06* (2013.01); *G06Q 10/0631* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 4,503,499 A | * | 3/1985 | Mason ................... G06Q 10/10 709/206 |
| 5,867,824 A | | 2/1999 | Saito et al. |

(Continued)

FOREIGN PATENT DOCUMENTS

| | | | | |
|---|---|---|---|---|
| EP | 1120712 A1 | * | 8/2001 | ............. H04L 41/22 |
| JP | 8-123744 | | 5/1996 | |

(Continued)

OTHER PUBLICATIONS

Notice of Reasons for Refusal for Japanese Application No. 2015-236562 dated May 14, 2019.

*Primary Examiner* — Abu Zar Ghaffari
(74) *Attorney, Agent, or Firm* — Staas & Halsey LLP

(57) ABSTRACT

A load-distribution-process-server includes: a memory; and a processor coupled to the memory and the processor configured to: receive a first execution request of a work flow including a plurality of process components each serving as a process execution unit and representing an execution sequence of the process components; execute the process components designated by the first execution request; select one load-distribution-process-server to execute a subsequent process component from a plurality of load-distribution-process-servers, based on a load condition of a first load-distribution-process-server and load conditions of second load-distribution-process-servers capable of processing the subsequent process component; and when the selected one load-distribution-process-server is one of the second load-distribution-process-servers, transmit a second execution request including an identifier of the work flow, transfer information of the work flow according to processes executed prior to the subsequent process component, and an identifier of the subsequent process component.

8 Claims, 12 Drawing Sheets

(56) References Cited

U.S. PATENT DOCUMENTS

| | | | |
|---|---|---|---|
| 6,032,124 A | 2/2000 | Saito et al. | |
| 6,757,577 B1* | 6/2004 | Jeng | G05B 19/41865 700/103 |
| 7,127,716 B2* | 10/2006 | Jin | G06Q 10/10 718/105 |
| 8,059,292 B2* | 11/2011 | Rai | G06Q 10/06 358/1.13 |
| 8,136,114 B1* | 3/2012 | Gailloux | G06Q 10/0631 705/7.12 |
| 8,417,805 B2* | 4/2013 | Zeine | G06F 9/5083 709/203 |
| 8,909,785 B2* | 12/2014 | Franco | H04L 67/1097 709/226 |
| 8,976,647 B2* | 3/2015 | Song | H04L 47/125 370/229 |
| 9,020,829 B2* | 4/2015 | Li | G06Q 10/04 705/7.12 |
| 9,413,687 B2* | 8/2016 | Jackson | G06F 9/5027 |
| 9,953,282 B2* | 4/2018 | Shaouy | G06Q 10/063112 |
| 2002/0049842 A1* | 4/2002 | Huetsch | H04L 29/06 709/225 |
| 2002/0166005 A1* | 11/2002 | Errico | G06F 3/0647 710/38 |
| 2004/0064356 A1 | 4/2004 | Saito et al. | |
| 2004/0078373 A1* | 4/2004 | Ghoneimy | G06Q 10/10 |
| 2006/0230077 A1* | 10/2006 | Satou | G06F 9/5027 |
| 2007/0118630 A1* | 5/2007 | Hashimoto | G06F 9/50 709/223 |
| 2008/0103866 A1* | 5/2008 | Wiener | G06Q 10/06 705/7.24 |
| 2011/0125539 A1* | 5/2011 | Bollapragada | G06Q 10/043 705/7.12 |
| 2011/0238458 A1* | 9/2011 | Purcell | G06F 9/5072 705/7.27 |
| 2011/0282707 A1* | 11/2011 | Rangaswamy | G06Q 10/06 705/7.26 |
| 2011/0289512 A1* | 11/2011 | Vecera | G06F 9/505 719/313 |
| 2011/0295645 A1* | 12/2011 | Barros | H04L 67/2838 705/7.26 |
| 2011/0320240 A1* | 12/2011 | Flores | G06Q 10/0633 705/7.27 |
| 2012/0044532 A1* | 2/2012 | Takahasi | G06F 9/5083 358/1.15 |
| 2012/0054768 A1* | 3/2012 | Kanna | G06F 9/5016 718/104 |
| 2012/0226797 A1* | 9/2012 | Ghosh | H04L 51/043 709/224 |
| 2013/0085799 A1* | 4/2013 | Zhang | G06Q 10/00 705/7.26 |
| 2013/0215795 A1* | 8/2013 | Raleigh | G06Q 10/06375 370/259 |
| 2014/0006092 A1* | 1/2014 | Kamada | G06Q 10/06316 705/7.26 |
| 2014/0058787 A1* | 2/2014 | Banner | G06Q 10/06312 705/7.26 |
| 2014/0089034 A1* | 3/2014 | Akita | G06Q 10/06 705/7.26 |
| 2015/0026336 A1* | 1/2015 | Suchter | G06F 9/5038 709/224 |
| 2015/0039379 A1* | 2/2015 | Brown | G06Q 10/06316 705/7.26 |
| 2015/0046212 A1* | 2/2015 | Mos | G06Q 10/0633 705/7.27 |
| 2015/0077776 A1* | 3/2015 | Hori | H04N 1/3255 358/1.13 |
| 2015/0195422 A1* | 7/2015 | Hakozaki | H04N 1/0092 358/1.15 |
| 2015/0358402 A1* | 12/2015 | Stolyar | H04L 47/125 709/226 |
| 2016/0014293 A1* | 1/2016 | Iwai | H04N 1/00949 358/1.15 |
| 2016/0274946 A1* | 9/2016 | Tanaka | G06K 9/00442 |

FOREIGN PATENT DOCUMENTS

| | | |
|---|---|---|
| JP | 11-96011 | 4/1999 |
| JP | 11-212911 | 8/1999 |
| JP | 2003-528358 | 9/2003 |
| JP | 2005-228252 | 8/2005 |
| JP | 2008-8310687 | 12/2008 |
| JP | 2010165265 A * | 7/2010 |

* cited by examiner

FIG.5

7d WORK FLOW DATA

```
<main title="test">
<branch id="1" title="[etc]waitTime(millisecond)">
<branch id="2" title="[Variable]setint(variableName,value)">
<branch id="3" title="[Variable]setint(variableName,value)(switch back)">
<branch id="4" title="[Calculation]division(value1,value2)">
<branch id="5" title="Policy execution setting confirmation">      7id PROCESS COMPONENTS ID
    <normalPart>
      <workItemNum>
      ...
      <workItem id="1" title="Policy execution setting confirmation">
        <argNum>
        <arg no="1" title="policyId" type="string">
        <executeParts name="com.fujitsu.kcn.scpf.common.parts.PartsScnOpe001">
        <result>
<branch id="6" title="Threshold value setting">
    <normalPart>
      <workItemNum>
      <workItem id="1" title="Threshold value setting">
        <argNum>
        <arg no="1" title="policyId" type="string">
        <arg no="2" title="otnId" type="string">
        <arg no="3" title="monitorId" type="string">
        <arg no="4" title="monitorName" type="string">
        <arg no="5" title="overTrafficThreshold" type="double"/>
        <arg no="6" title="underTrafficThreshold" type="double"/>
        <arg no="7" title="thresholdUnit" type="string"/>
        <executeParts name="com.fujitsu.kcn.scpf.common.parts.PartsScnOpe003">
<branch id="7" title="Packet Collecting setting confirmation">
<branch id="8" title="[Pvsics] bandwidth capacity retrieval">
```

7n

7p PROCESS COMPONENTS

131 COMPONENT INFORMATION TABLE

| WORK FLOW ENGINE NAME | PROCESS COMPONENT NAME |
|---|---|
| WFE-1 | a1, a2, a3 |
| WFE-2 | b1, b2, b3 |
| WFE-3 | a1, a2, a3, b1, b2, b3 |
| ... | ... |

FIG.7

132 WORK FLOW ENGINE INFORMATION TABLE

| WORK FLOW ENGINE NAME | ACCESS INFORMATION | LOAD |
|---|---|---|
| WFE-1 | IP1 | 10 |
| WFE-2 | IP2 | 20 |
| WFE-3 | IP3 | 40 |
| ... | ... | ... |

FIG.13

132-2 WORK FLOW ENGINE INFORMATION TABLE

| WORK FLOW ENGINE NAME | PROCESS COMPONENT NAME |
|---|---|
| WFE-1 | a1, a2, a3, b1, b2, b3 |
| WFE-2 | b1, b2, b3 |
| WFE-3 | b1, b2, b3 |
| ... | ... |

LOAD DISTRIBUTION OF WORKFLOW EXECUTION REQUEST AMONG DISTRIBUTED SERVERS

CROSS-REFERENCE TO RELATED APPLICATION

This application is based upon and claims the benefit of priority from the prior Japanese Patent Application No. 2015-236562, filed on Dec. 3, 2015, the entire contents of which are incorporated herein by reference.

FIELD

The embodiments discussed herein are related to a load distribution process server, a load distribution process method, and a load distribution process system.

BACKGROUND

A system in which a plurality of computers (agents) cooperate with each other to execute works along a work flow defining a process sequence has been recently introduced. For example, a technique of monitoring the capacities and load state of the agents, executing an appropriate work, and controlling the communication traffic among the agents has been known.

Related techniques are disclosed in, for example, Japanese Laid-Open Patent Publication Nos. 11-96011, and 8-123744, and Japanese National Publication of International Patent Application No. 2003-528358.

SUMMARY

According to an aspect of the invention, a load distribution process server of a plurality of load distribution process servers, the load distribution process server includes: a memory; and a processor coupled to the memory and the processor configured to: receive a first execution request of a work flow including a plurality of process components each serving as a process execution unit and representing an execution sequence of the process components; execute the process components designated by the first execution request; select one load distribution process server to execute a subsequent process component from the plurality of load distribution process servers, based on a load condition of a first load distribution process server and load conditions of second load distribution process servers of the plurality of load distribution process servers capable of processing the subsequent process component, the first load distribution process server being the load distribution process server; and when the selected one load distribution process server is one of the second load distribution process servers, transmit, to the selected one load distribution process server, a second execution request including an identifier of the work flow, transfer information of the work flow according to processes executed prior to the subsequent process component, and an identifier of the subsequent process component.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a view illustrating exemplary work flow data;

FIG. 6 is a view illustrating an exemplary data configuration of a component information table;

FIG. 7 is a view illustrating an exemplary data configuration of a work flow engine information table;

FIG. 13 is a view illustrating an exemplary setting of the component information table to suppress a competition of accesses to an external system.

DESCRIPTION OF EMBODIMENTS

An increase of applications handling various data such as videos, images, and games, and furthermore, an increase of new-style data communications using sensors, wearable terminals and others have made a work flow complicated and increased types of work flows.

In the related techniques above-described, since the monitoring of the capacity and load state is performed for all the agents, various changes along the work flow may not be flexibly responded.

Figure 1:
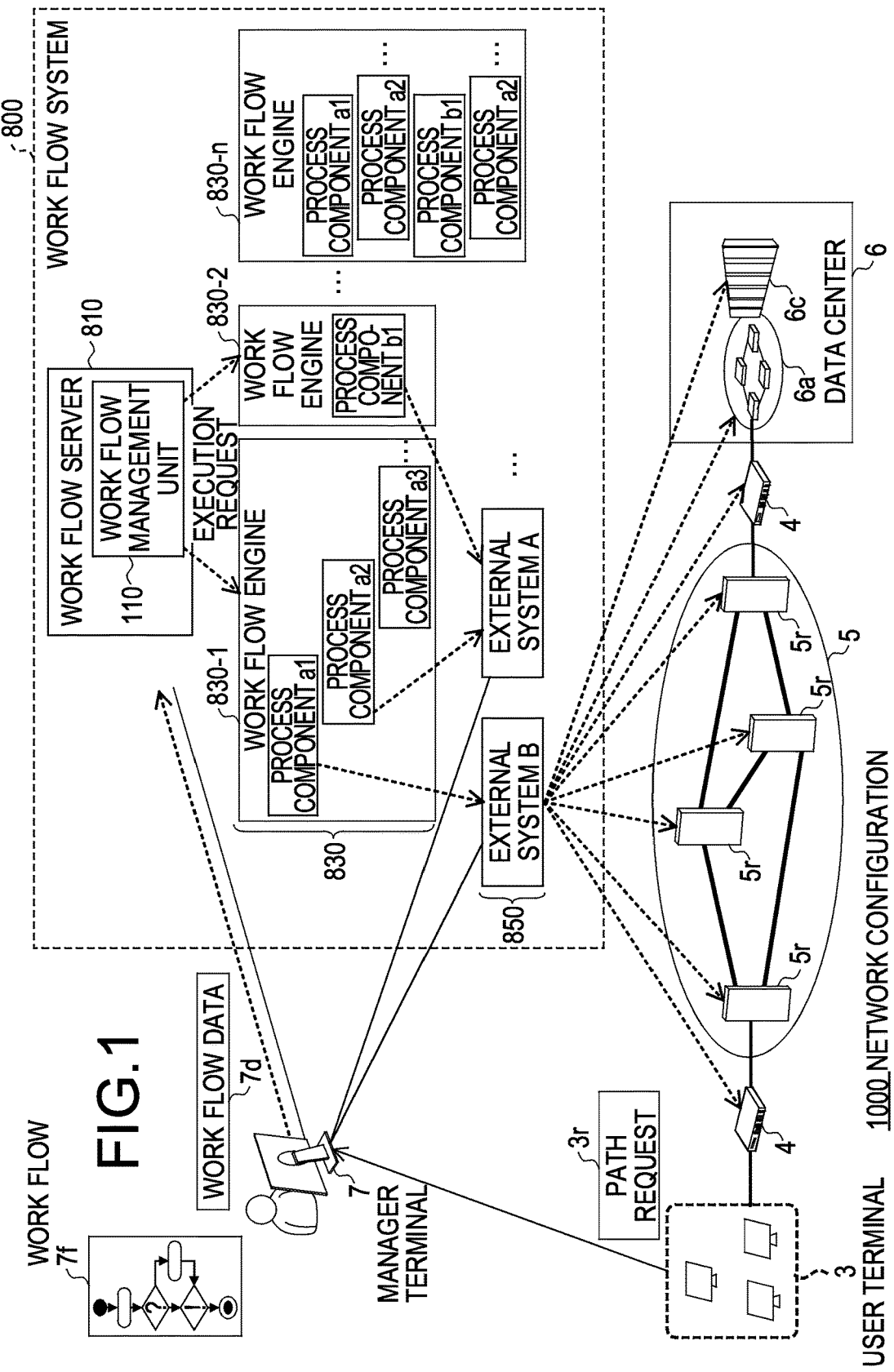
FIG. 1 is a view illustrating an exemplary network configuration in an embodiment.

Hereinafter, an embodiment of a technique which flexibly performs a load distribution process of a work flow will be described based on the accompanying drawings. FIG. 1 is a view illustrating an exemplary network configuration in the embodiment. In FIG. 1, a network configuration 1000 of the embodiment includes a user terminal 3, a gateway 4, a wide area network (WAN) 5, a data center 6, a manager terminal 7, and a work flow system 800.

The user terminal 3 is an information processing terminal in which a work is performed by data transmission/reception with the data center 6 connected to the user terminal 3 through the gateway 4 and the WAN 5. The user terminal 3 may be any one of various information processing terminals such as a desktop type, a notebook type, a tablet type, and a portable type. The gateway 4 is a network equipment connecting the user terminal 3 and the external WAN 5 to each other. The external WAN 5 includes a plurality of relay devices 5r to conduct a data communication between the user terminal 3 and the data center 6.

The work performed by the user terminal 3 is not limited to the data communication with the data center 6. The work is implemented in cooperation with various servers, and the data center 6 is merely an example of the servers.

The manager terminal 7 is an information processing terminal which causes, in response to a path request 3r from the user terminal 3, the work flow system 800 to control a work flow 7f along the path request 3r, and is used by a manager monitoring the work flow 7f. The manager may identify an execution result of the work flow 7f by accessing a work flow server 810 and external systems 850 through the manager terminal 7.

The work flow system 800 includes the work flow server 810, a plurality of work flow engines 830 including work flow engines 830-1, . . . 830-n, and a plurality of external systems 850 including, for example, external systems A and B. The work flow server 810 and the plurality of work flow engines 830 are connected to each other by a network or the like. In addition, each of the plurality of work flow engines 830 is connected to one or more external systems 850 by a network or the like.

In the present embodiment, the work flow data 7d describing the work flow 7f is preset in the work flow server 810 and the plurality of work flow engines 830 through the manager terminal 7. The work flow server 810 and each of the plurality of work flow engines 830 hold the work flow data 7d.

The work flow server 810 is a server device that selects one of the plurality of work flow engines 830 based on load information according to the work flow data 7d when receiving an execution request designating a work flow name for identifying the work flow 7f from the manager terminal 7, and transmits the execution request to the selected work flow engine 830 to cause the work flow engine 830 to execute contents of the work flow 7f represented by the execution request in cooperation with the other work flow engines 830.

Each work flow engine 830 is an information processing device that causes one or more external systems 850 to perform processes in response to the reception of the execution request from the work flow server 810 or one of the other work flow engines 830.

Each work flow engine 830 is a server including one or a plurality of process components a1, a2, . . . , b1, b2, . . . and others which perform specific processes by controlling one or more external systems. Each of the process components a1, . . . , b1, . . . and others performs a specific process by controlling one of the plurality of external systems 850 including the external systems A and B and others.

As an example of the external systems 850, the external system A is a computer device that monitors and controls the entire network between the user terminal 3 and the data center 6, including the gateway 4, the WAN 5, LAN 6a and a database (DB) server 6c within the data center 6 and others, in order to successfully implement the data transmission between the user terminal 3 and the data center 6. The external system B may be a computer device that manages a contract for various works (e.g., an application license) and performs a work based on the contract.

Figure 2:
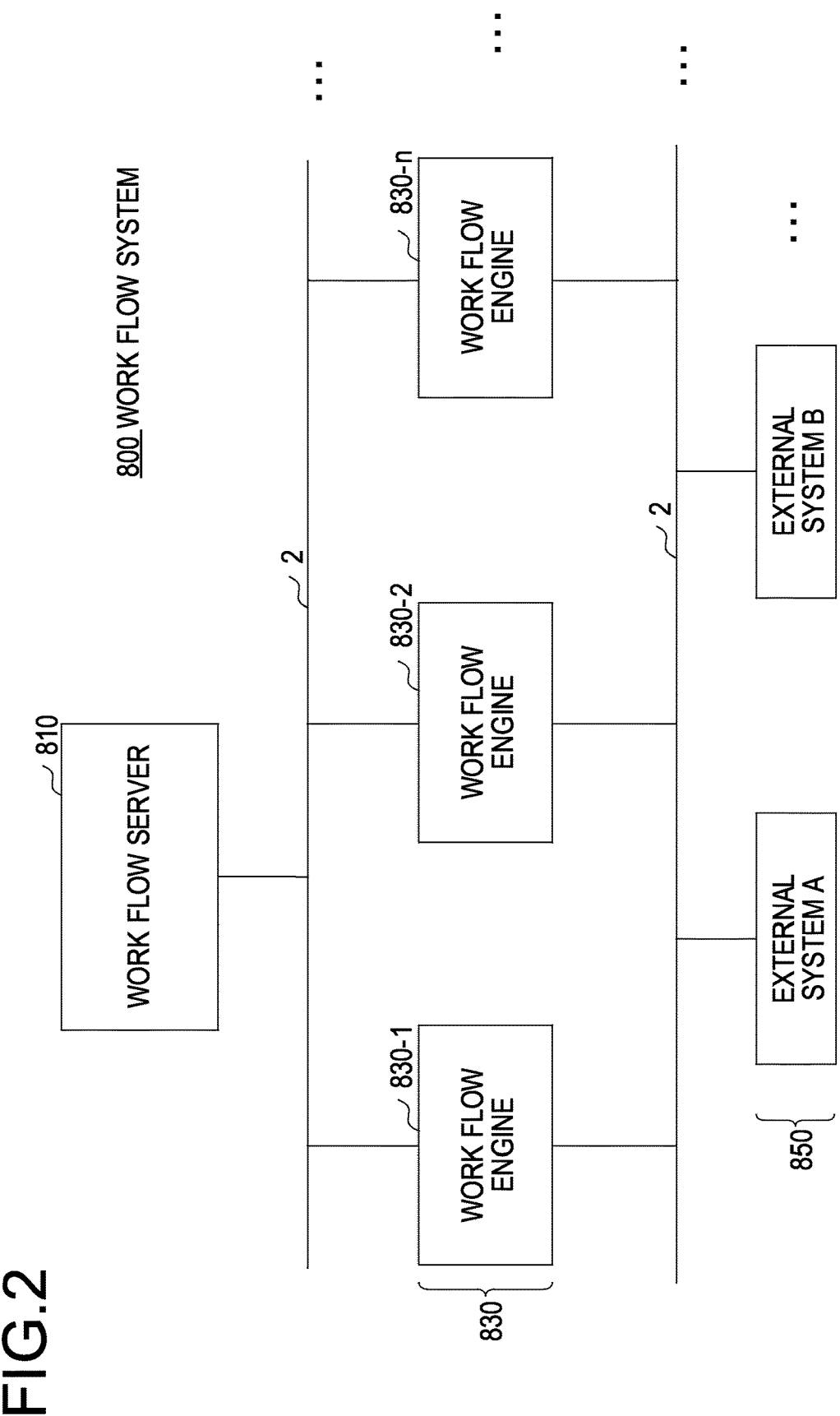
FIG. 2 is a view illustrating an exemplary network configuration within a work flow system.

FIG. 2 is a view illustrating an exemplary network configuration within the work flow system. In FIG. 2, the work flow server 810 is connected to the plurality of work flow engines 830 through a network 2.

Each work flow engine 830 may be connected to the external systems 850 through the network 2. Each work flow engine 830 implements the contents of the work flow 7f by controlling the external systems 850 related to processes to be executed.

Figure 3:
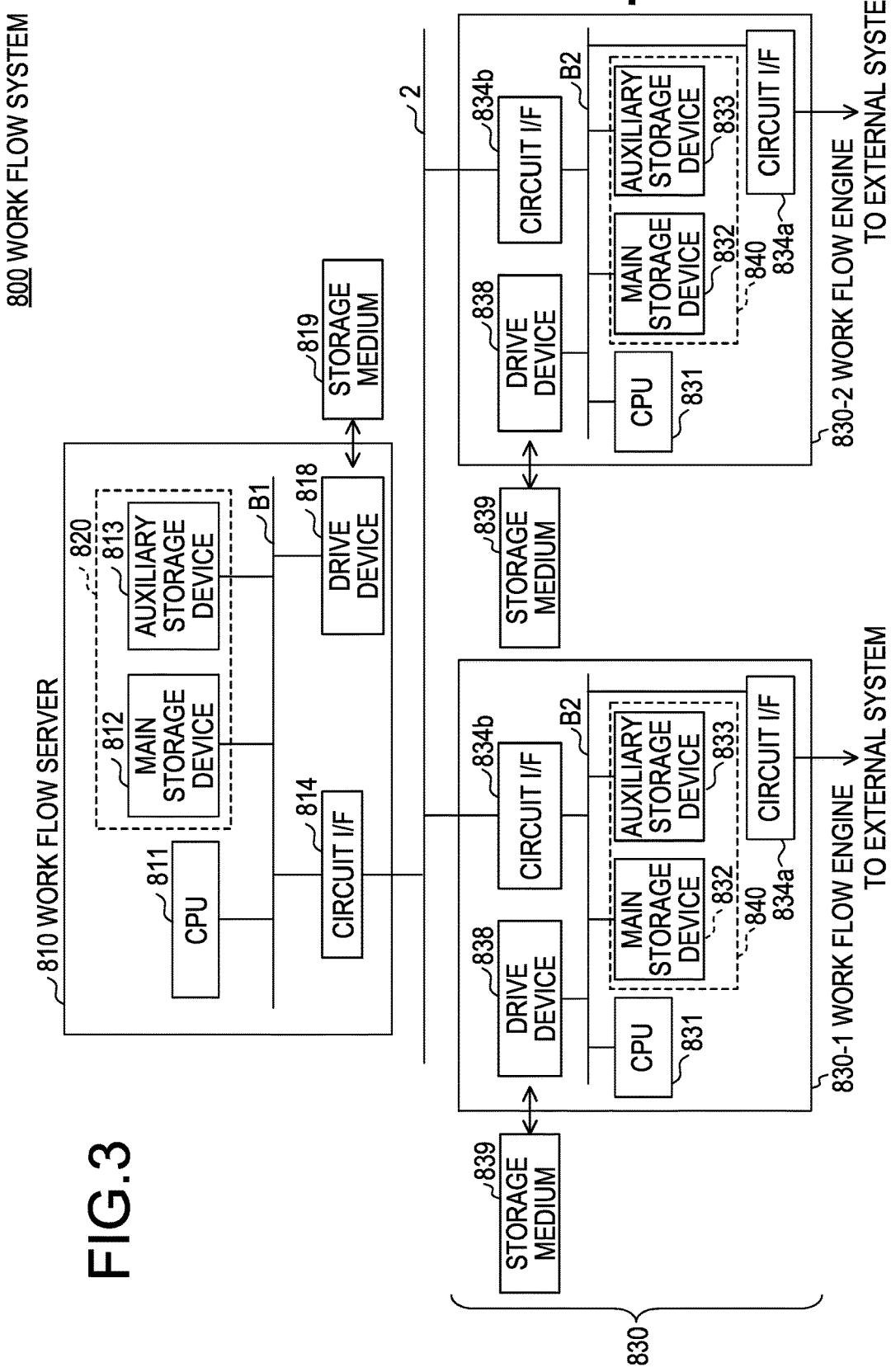
FIG. 3 is a view illustrating a hardware configuration within the work flow system.

Subsequently, a hardware configuration according to the present embodiment will be described. FIG. 3 is a view illustrating a hardware configuration in the work flow system. FIG. 3 represents a hardware configuration according to the present embodiment and omits other configurations.

In FIG. 3, the work flow server 810, as a computer-controlled server device, includes a central processing unit (CPU) 811, a main storage device 812, an auxiliary storage device 813, a circuit interface (I/F) 814, and a drive device 818 which are connected to a bus B1.

The CPU 811 corresponds to a processor that controls the work flow server 810 according to a program stored in the main storage device 812. The main storage device 812 may be a random access memory (RAM), a read only memory (ROM) or the like, and stores or temporarily holds a program to be executed by the CPU 811, data required for a process in the CPU 811, data obtained from a process in the CPU 811 and others.

The auxiliary storage device 813 may be a hard disk drive (HDD) or the like and stores data such as programs to execute various processes. When a portion of the programs stored in the auxiliary storage device 813 is loaded to the main storage device 812 and executed by the CPU 811, various processes are implemented. The storage unit 820 corresponds to the main storage device 812 and the auxiliary storage device 813.

The circuit I/F 814 performs a communication with each of the plurality of work flow engines 830 through the network 2. The circuit I/F 814 also performs a communication with the manager terminal 7. The communication performed by the circuit I/F 814 is not limited to a wireless or wired communication.

The programs to implement processes to be executed by the work flow server 810 are provided to the work flow server 810 by a storage medium 819 such as a compact disc read only memory (CD-ROM).

The drive device 818 is an interface between the storage medium 819 set for the drive device 818 (e.g., a CD-ROM) and the work flow server 810.

In addition, the programs to implement various processes according to the present embodiment as described later are stored in the storage medium 819, and the programs stored in the storage medium 819 are installed in the work flow server 810 through the drive device 818. The installed programs are executable by the work flow server 810.

In addition, the storage medium 819 storing the programs is not limited to a CD-ROM and may be one or more non-transitory tangible media having a computer readable structure. The computer readable storage medium may be a portable recording medium such as a DVD disk or a USB memory, or a semiconductor memory such as a flash memory, beside the CD-ROM.

While the work flow server 810 has the hardware configuration that can be controlled by the manager terminal 7 as illustrated, the work flow server 810 may include, for example, an input device such as a mouse or a keyboard, and a display device displaying a variety of information.

The plurality of work flow engines 830 including the work flow engines 830-1 and 830-2 and others is connected to the work flow server 810 through the network 2. The respective work flow engines 830, as computer-controlled information processing devices, have substantially the same hardware configuration. Each work flow engine 830 includes a CPU 831, a main storage device 832, an auxiliary storage device 833, circuit I/F 834a and 834b, and a drive device 838.

The CPU 831 corresponds to a processor that controls the work flow server 810 according to the programs stored in the main storage device 832. The main storage device 832 may be a random access memory (RAM), a read only memory (ROM) or the like. The main storage device 832 stores or temporarily holds a program to be executed by the CPU 831, data required for a process in the CPU 831, and data obtained from a process in the CPU 831.

The auxiliary storage device 833 may be a hard disk drive (HDD) or the like, and stores data such as programs to execute various processes. When a portion of the programs stored in the auxiliary storage device 833 is loaded to the main storage device 832 and executed by the CPU 831, various processes are implemented. The storage unit 840 corresponds to the main storage device 832 and the auxiliary storage device 833.

The circuit I/F 834a performs a communication with the work flow server 810 and each of the other work flow engines 830 through the network 2. The circuit I/F 834b performs a communication with one or more external systems 850. The communication performed by the circuit I/F 834a and 834b is not limited to a wireless or wired communication.

The programs to implement processes to be executed by the work flow engine 830 are provided to the work flow engine 830 by a storage medium 839 such as a compact disc read only memory (CD-ROM).

The drive device 838 is an interface between the storage medium 839 set for the drive device 838 (e.g., a CD-ROM) and the work flow engine 830.

In addition, the programs to implement various processes according to the present embodiment as described later are stored in the storage medium 839, and the programs stored in the storage medium 839 are installed in the work flow engine 830 through the drive device 838. The installed programs are executable by the work flow engine 830.

In addition, the storage medium 839 storing the programs is not limited to a CD-ROM and may be one or more non-transitory tangible media having a computer readable structure. The computer readable storage medium may be a portable recording medium such as a DVD disk or a USB memory, or a semiconductor memory such as a flash memory, in addition to the CD-ROM.

Figure 4:
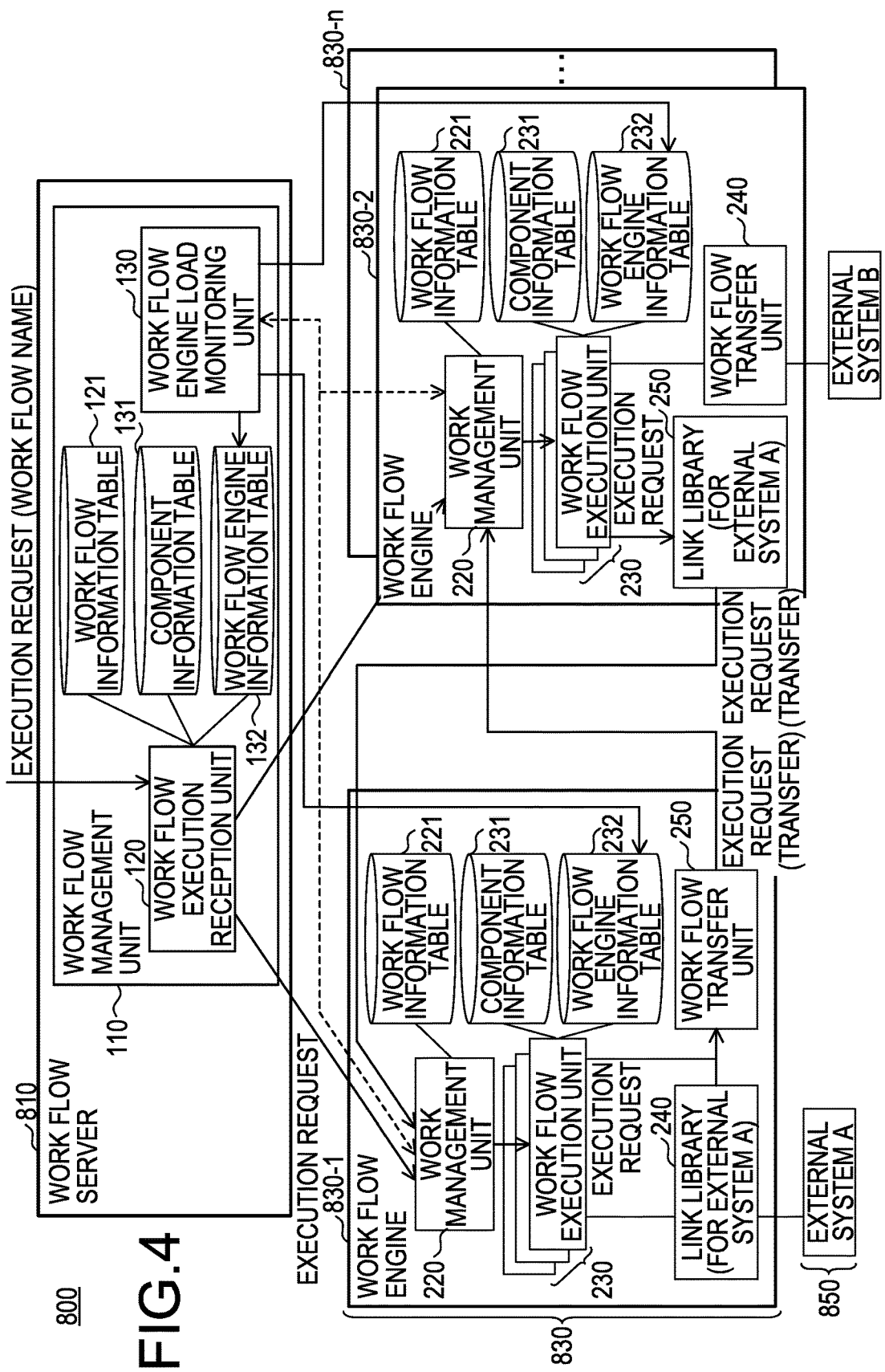
FIG. 4 is a view illustrating an exemplary functional configuration of the work flow system.

FIG. 4 is a view illustrating an exemplary functional configuration of the work flow system. In the work flow system 800 illustrated in FIG. 4, the work flow data 7d (see, e.g., FIG. 1) is provided in advance to the work flow server 810 and each work flow engine 830. The work flow server 810 manages the work flow data 7d by storing the data in a work flow information table 121. Each work flow engine 830 also manages the work flow data 7d by storing the data in a work flow information table 221.

The work flow server 810 mainly includes a work flow management unit 110. In order to execute processes along the work flow 7f designated by the execution request received from the manager terminal 7 through the circuit I/F 814, the work flow management unit 110 monitors the loads of the plurality of work flow engines 830 and selects a work flow engine 830 depending on the loads to make the execution request to the selected work flow engine 830.

Upon receiving a process result for the execution request from one of the plurality of work flow engines 830, the work flow management unit 110 notifies the manager terminal 7 of the process result.

The work flow management unit 110 further includes a work flow execution reception unit 120 and a work flow engine load monitoring unit 130. In addition, the storage unit 820 of the work flow server 810 stores the work flow information table 121, a component information table 131, a work flow engine information table 132, and others.

The work flow execution reception unit 120 receives the execution request of the work flow 7f and selects a work flow engine 830 to perform the execution request of the work flow 7f thereto. First, the work flow execution reception unit 120 acquires the work flow data 7d of the work flow name of the execution request from the work flow information table 121.

Subsequently, the work flow execution reception unit 120 identifies a process component to be first executed in the work flow 7f with reference to the component information table 131, and specifies a work flow engine 830 capable of processing the process component.

When multiple work flow engines 830 are specified as candidates for processing the process component, the work flow execution reception unit 120 selects a work flow engine 830 of which the load is the lowest, with reference to the work flow engine information table 132. The load may be a CPU use rate, the number of work flows 7f being operated or the like.

The work flow information table 121 corresponds to a table in which a work flow name of a work flow 7f and the work flow data 7d are associated with each other.

The component information table 131 corresponds to a table representing the name of a process component included in each work flow engine 830 for an access to the external systems 850. The process component name represents a name for identifying a process component or a process component ID. Alternatively, the component information table 131 may manage a process component name, and a separate table may manage the process component name associated with a process component ID.

The work flow engine information table 132 corresponds to a table storing information for access to each work flow engine 830 and load information thereof. The load information represents a CPU use rate, the number of work flows being executed or the like.

The work flow engine load monitoring unit 130 periodically collects the load information from a work management unit 220 of each work flow engine 830 within the work flow system 800, and updates the work flow engine information table 132.

In addition, the work flow engine load monitoring unit 130 updates a work flow engine information table 232 of each work flow engine 830. The load information represents a CPU use rate, the number of work flows 7f being operated or the like.

In the work flow system 800, each work flow engine 830 mainly includes the work management unit 220, one or more work flow execution units 230, a link library 240, and a work flow transfer unit 250.

In addition, the storage unit 840 of each work flow engine 830 stores a work flow information table 221, a component information table 231, a work flow engine information table 232 and others. Since the work flow information table 221, the component information table 231, the work flow engine information table 232 correspond to the work flow information table 121, the component information table 131, and the work flow engine information table 132, respectively, descriptions thereof will be omitted.

Upon receiving the execution request of the work flow 7f from the work flow server 810 or the other work flow engines 830 through the circuit I/F 834b, the work management unit 220 starts the work flow execution unit 230 to perform the execution request of the work flow 7f, and manages a result of the execution of the work flow 7f by the work flow execution unit 230. The work management unit 220 includes a reception unit that receives the execution request of the work flow 7f.

The work management unit 220 acquires the work flow data 7d associated with a work flow name designated by the execution request with reference to the work flow information table 221, and notifies the work flow execution unit 230 of the data.

The work flow execution unit 230 sequentially executes process contents designated within the work flow 7f by the execution request from the work management unit 220. The work flow execution unit 230 determines whether the process contents are executable, with reference to the component information table 231, and performs either executing the process contents by controlling the external systems 850 through the link library 240 or causing the work flow transfer unit 250 to transfer the work flow 7f to one of the other work flow engines 830.

The link library 240 is a group of application programming interface (API) components for an access to the external systems 850 such as the external systems A and B.

In response to the transfer request from the work flow execution unit 230, the work flow transfer unit 250 performs an execution request to transfer the process during the work flow 7f to one of the other work flow engines 830.

Descriptions will be made on a case where the work flow server 810 selects a work flow engine 830-1, in FIG. 4. The descriptions are also identically applied to a case where, for example, a work flow engine 830-2 is selected.

Upon receiving the execution request from the work flow server 810, the work management unit 220 of the work flow engine 830-1 acquires the work flow data 7d associated with the work flow name designated by the execution request from the work flow information table 221, and starts the work flow execution unit 230.

The work flow execution unit 230 executes a process by a process component which is executable by the work flow execution unit 230, according to the process components and the execution sequence thereof represented in the work flow data 7d. The link library 240 controls the external system A by being API called from the process component.

When the process component represented in the work flow data 7d does not exist, the work flow execution unit 230 of the work flow engine 830-1 selects a subsequent work flow engine 830 by itself, with reference to the component information table 231, and makes a transfer request to the work flow transfer unit 250. It is assumed that the work flow engine 830-2 is selected as the subsequent work flow engine.

The transfer request designates information such as information specifying the subsequent work flow engine 830-2 (e.g., an Internet Protocol (IP) address), the work flow name of the work flow 7f, transfer information based on processes executed prior to a process component to be subsequently executed, and an ID of a process component to be subsequently executed (process component ID).

In response to the transfer request from the work flow execution unit 230, the work flow transfer unit 250 prepares an execution request for transfer, and transmits the execution request for transfer to the work flow engine 830-2 designated by the transfer request. The execution request for transfer includes information such as the work flow name, the transfer information, and an ID of a process component to be subsequently executed as designated by the transfer request.

Upon receiving the execution request (request) from the work flow engine 830-1, the work management unit 220 of the work flow engine 830-2 acquires the work flow data 7d associated with the work flow name designated by the execution request for transfer from the work flow information table 221, and starts the work flow execution unit 230.

The work flow execution unit 230 starts the process by the process component specified by the designated process component ID, according to the process components and the execution sequence thereof represented in the work flow data 7d. The link library 240 controls the external system B by being API called from the process component.

When the process component represented in the work flow data 7d does not exist, the work flow engine 830-2 selects a subsequent work flow engine 830 by itself with reference to the component information table 231, and makes a transfer request to the work flow transfer unit 250. It is assumed that the work flow engine 830-1 is selected as the subsequent work flow engine.

The transfer request designates information such as information specifying the subsequent work flow engine 830-1 (e.g., an Internet Protocol (IP) address), the work flow name of the work flow 7f, transfer information based on processes executed prior to a process component to be subsequently executed, and an ID of a process component to be subsequently executed.

In response to the transfer request from the work flow execution unit 230, the work flow transfer unit 250 prepares an execution request for transfer, and transmits the execution request for transfer to the work flow engine 830-1 designated by the transfer request. The execution request for transfer includes information such as the work flow name, the transfer information, and an ID of a process component to be subsequently executed as designated by the transfer request.

A notification of the completion of the processes based on the work flow 7f is performed to the work flow server 810 by the work flow engine 830 that has completed the work flow 7f. In addition, when it is determined that the processes based on the work flow 7f are not executable, the work flow engine 830 making the determination notifies the work flow server 810 of the impossible execution.

As described above, in the present embodiment, only one of the plurality of work flow engines 830 may be performed, based on the load information, according to the initial execution request. Each work flow engine 830 selects a subsequent work flow engine 830 to which the processes are to be transferred during the work flow 7f, based on, for example, the determination result of whether the processes are executable and the load information. Accordingly, the process distribution may be appropriately performed during the execution of the work flow 7f. Further, the load applied to the management process of the work flow server 810 may be reduced.

FIG. 5 is a view illustrating exemplary work flow data. FIG. 5 represents the work flow data 7d described in the extensible markup language (XML) as an example. The work flow data 7d is specified by a work flow name 7n. In each tag <branch>, a process component ID 7id is designated by id, and a process component 7p is specified.

The process component 7p is a process execution unit. That is, the work flow 7f includes a plurality of process components 7p, and represents an execution sequence of the plurality of process components 7p by the work flow data 7d.

Subsequently, descriptions will be made on an exemplary data configuration of the component information table 131 and the work flow engine information table 132, with reference to FIGS. 6 and 7.

FIG. 6 is a view illustrating an exemplary data configuration of the component information table. In FIG. 6, the component information table 131 represents process components which can be processed by each work flow engine 830, and includes items such as a work flow engine name and a process component name.

The work flow engine name represents information such as a name for identifying each of the plurality of work flow engines 830. The process component name represents information such as a name for identifying a process component which can be processed by each work flow engine 830.

In the exemplary data illustrated in FIG. 6, process components which can be processed by the work flow engine 830 of the work flow engine name "WFE-1" are represented as the process component names a1, a2, and a3.

The process components which can be processed by the work flow engine 830 of the work flow engine name "WFE-2" are represented as the process component names b1, b2, and b3.

The process components which can be processed by the work flow engine 830 of the work flow engine name "WFE-3" are represented as the process component names a1, a2, a3, b1, b2, and b3.

FIG. 7 is a view illustrating an exemplary data configuration of the work flow engine information table. In FIG. 7, the work flow engine information table 132 is referred to in determining a work flow engine 830 and includes items such as a work flow engine name, access information, and a load.

The work flow engine name represents information such as a name for identifying a work flow engine 830 being currently operated (e.g., a host name). The access information represents information such as an IP address for access, account information, or authentication information. The load represents, for example, a CPU use rate of a work flow engine 830 or the number of work flows being executed.

In the data illustrated in FIG. 7, for the work flow engine 830 of the work flow engine name "WFE-1," the access is represented as the access information "IP1," and the load is represented as "10."

For the work flow engine 830 of the work flow engine name "WFE-2," the access is represented as the access information "IP2," and the load is represented as "20." For the work flow engine 830 of the work flow engine name "WFE-3," the access is represented as the access information "IP3," and the load is represented as "40."

Figure 8:
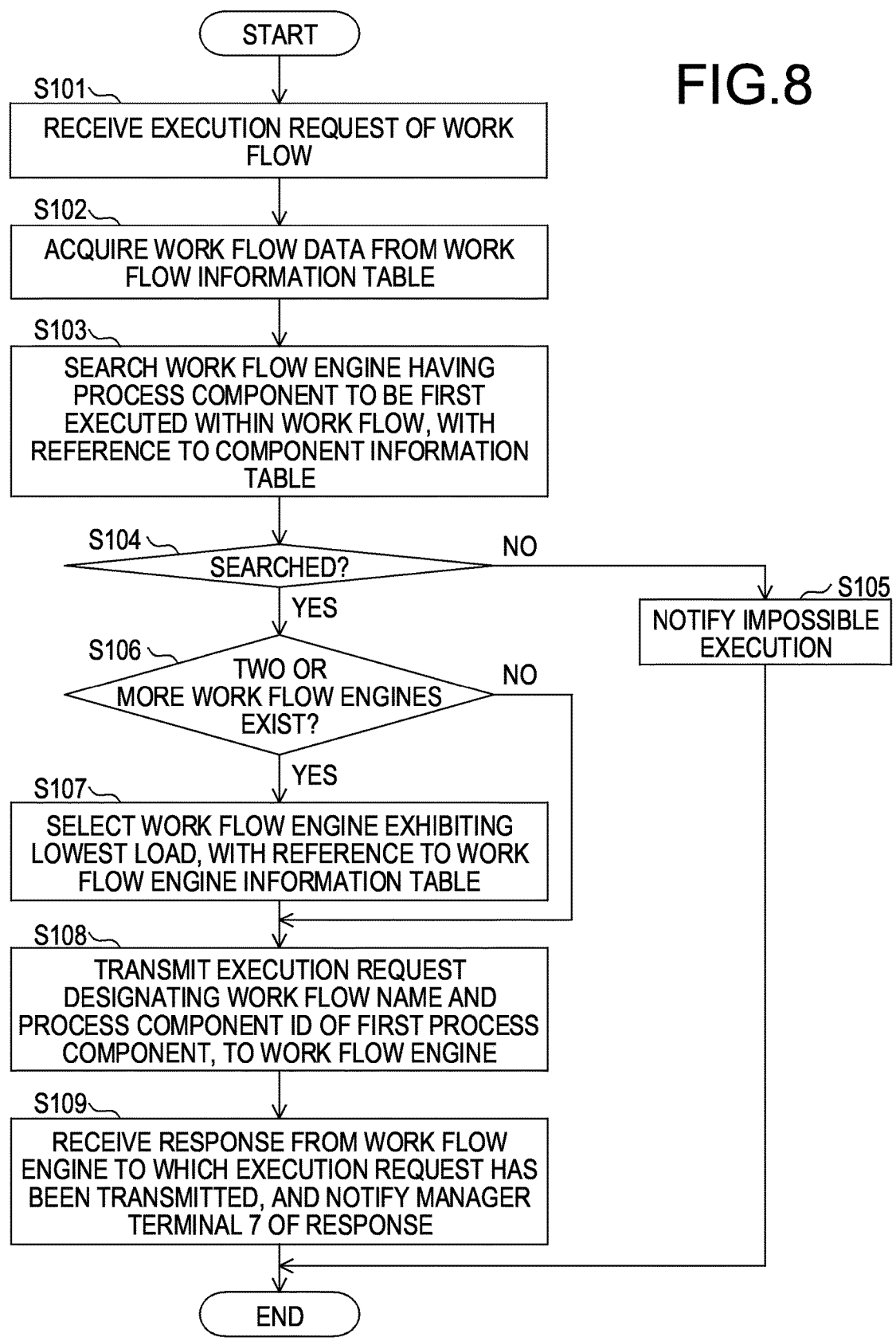
FIG. 8 is a flow chart for explaining processes by a work flow management unit.

Subsequently, processes by the work flow management unit 110 of the work flow server 810 will be described. FIG. 8 is a flow chart for explaining processes by the work flow management unit.

In FIG. 8, upon receiving the execution request designating the work flow name of the work flow 7*f* from the manager terminal 7 through the circuit I/F 814 (operation S101), the work flow management unit 110 acquires the work flow data 7*d* of the work flow name of the execution request from the work flow information table 121 (operation S102).

The work flow management unit 110 searches a work flow engine 830 having a process component to be first executed within the work flow 7*f*, with reference to the component information table 131 (operation S103).

That is, the work flow management unit 110 analyzes the work flow data 7*d* to extract the name of a process component to be first executed in the work flow 7*f*, and searches a work flow engine 830 to execute the first process from the component information table 131 by using the extracted process component name. When a work flow engine is searched, a work flow engine name of the work flow engine 830 is extracted.

The work flow management unit 110 determines whether a work flow engine 830 is searched (operation S104). When it is determined that a work flow engine 830 is not searched (NO of operation S104), the work flow management unit 110 determines that a work flow engine 830 capable of executing the first process does not exist in the requested work flow 7*f*, and notifies the manager terminal 7 of the impossible execution (operation S105). Thereafter, the work flow management unit 110 finishes the processes for the execution request of the work flow 7*f* as received in operation S101.

When it is determined that a work flow engine 830 is searched (YES of operation S104), the work flow management unit 110 determines that a work flow engine 830 capable of executing the first process exists in the requested work flow 7*f*, and determines whether two or more work flow engines 830 exist (operation S106).

When it is determined that two or more work flow engines 830 do not exist (NO of operation S106), the work flow management unit 110 proceeds to operation S108 in order to make the execution request of the work flow 7*f* to the searched work flow engine 830.

Meanwhile, when it is determined that two or more work flow engines 830 exist (YES of operation S106), the work flow management unit 110 selects a work flow engine 830 of which the load is the lowest, from the two or more work flow engines 830, with reference to the work flow engine information table 132 (operation S107).

The work flow management unit 110 transmits the execution request designating at least the work flow name and the process component ID of the first process component, to the work flow engine 830 (operation S108). Thereafter, the work flow management unit 110 receives a response from the work flow engine 830 to which the execution request has been transmitted, and notifies the manager terminal 7 of the response (operation S109). Thereafter, the work flow management unit 110 finishes this process.

Figure 9:
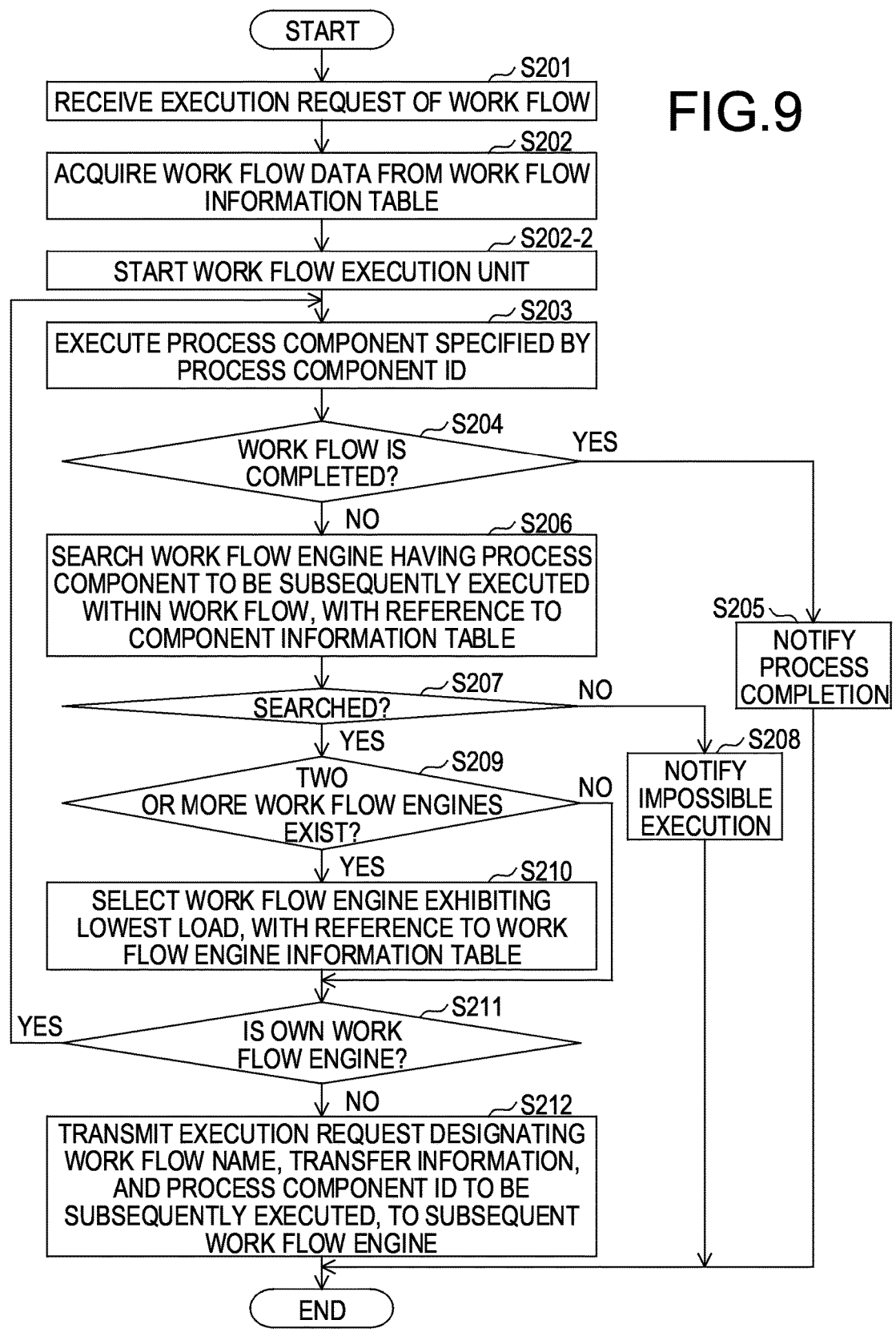
FIG. 9 is a flow chart for explaining processes by a work flow engine.

Subsequently, processes by the work flow engine 830 will be described. FIG. 9 is a flow chart for explaining processes by the work flow engine.

In FIG. 9, in the work flow engine 830, when receiving the execution request designating at least the work flow name of the work flow 7*f* and the process component ID of the process component to be executed from the work flow server 810 or one of the other work flow engines 830 through the circuit I/F 834*b* (operation S201), the work management unit 220 acquires the work flow data 7*d* of the work flow name of the execution request from the work flow information table 221 (operation S202).

When the execution request is received from the work flow server 810, an ID of a first process component in the work flow 7*f* is designated. When the execution request is received from one of the other work flow engines 830, an ID of a process component during the work flow 7*f* is designated.

The work management unit 220 starts the work flow execution unit 230 and notifies the work flow execution unit 230 of the acquired work flow data 7*d* and the process component ID designated by the execution request (operation S202-2). The following process is repeated by the process component specified by the process component ID designated by the execution request.

The work flow execution unit 230 executes the process component specified by the process component ID (operation S203), and searches a subsequent process component ID from the work flow data 7*d* to determine whether the work flow 7*f* has been finished (operation S204). When a subsequent process component ID exists, it is determined that the work flow 7*f* has not been finished.

When no subsequent process component ID exists so that it is determined that the work flow 7*f* has been finished (YES of operation S204), the work flow execution unit 230 notifies the work flow server 810 of the process completion (operation S205). The process completion is notified to the manager terminal 7 from the work flow server 810. Thereafter, the work flow engine 830 finishes the processes for the execution request of the work flow 7*f* as received in operation S101.

Meanwhile, when a subsequent process component ID exists so that it is determined that the work flow 7*f* has not been finished (NO of operation S204), the work flow execution unit 230 searches a work flow engine 830 having a process component to be subsequently executed within the work flow 7*f*, with reference to the component information table 231 (operation S206).

That is, the work flow execution unit 230 analyzes the work flow data 7*d* to extract a process component subsequent to the process component executed in operation S203 in the work flow 7*f*, and searches a work flow engine 830 to execute the subsequent process from the component information table 131 by using the extracted process component name. When a work flow engine is searched, a work flow engine name of the work flow engine 830 is extracted.

The work flow execution unit 230 determines whether a work flow engine 830 is searched (operation S207). When it is determined that no work flow engine 830 is searched (NO of operation S207), the work flow execution unit 230 determines that a work flow engine 830 capable of executing the subsequent process does not exist in the requested work flow 7*f*, and notifies the manager terminal 7 of the impossible execution (operation S208). Thereafter, the work flow execution unit 230 finishes the processes for the execution request of the work flow 7*f* as received in operation S201.

When it is determined that a work flow engine 830 is searched (YES of operation S207), the work flow execution unit 230 determines that a work flow engine 830 capable of executing the subsequent process exists in the requested work flow 7*f*, and determines whether two or more work flow engines 830 exist (operation S209).

When it is determined that two or more work flow engines 830 do not exist (NO of operation S209), the work flow execution unit 230 proceeds to operation S211.

Meanwhile, when it is determined that two or more work flow engines 830 exist (YES of operation S209), the work flow execution unit 230 selects a work flow engine 830 of which the load is the lowest, from the two or more work flow engines 830, with reference to the work flow engine information table 132 (operation S210).

The work flow execution unit 230 determines whether the work flow engine 830 executing the subsequent process is the work flow engine of the work flow execution unit 230 itself (operation S211). When it is determined that the work flow engine 830 executing the subsequent process is the work flow engine of the work flow execution unit 230 itself (YES of operation S211), the work flow execution unit 230 returns to operation S203 to perform the above-described processes.

Meanwhile, when it is determined that the work flow engine 830 executing the subsequent process is one of the other work flow engines 830 (NO of operation S211), the work flow execution unit 230 transmits the execution request designating at least the work flow name, the transfer information, and an ID of the process component to be subsequently executed, to the subsequent work flow engine 830 (operation S212). Thereafter, the work flow execution unit 230 finishes this process.

Figure 10:
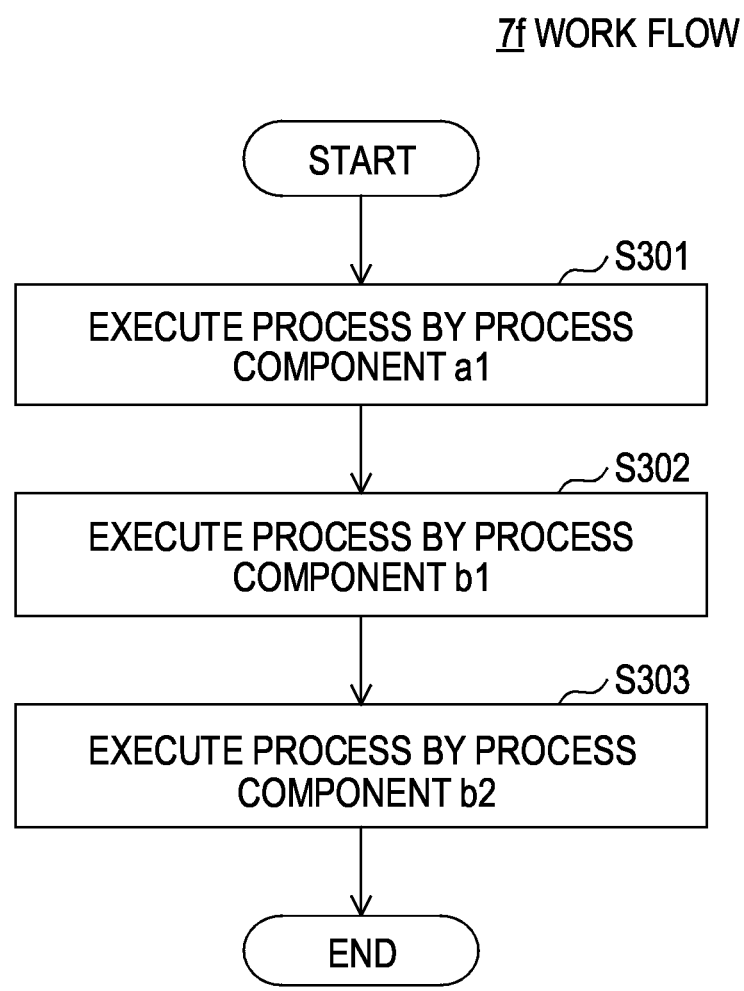
FIG. 10 is a view illustrating an exemplary work flow.

Subsequently, exemplary processes implemented in the present embodiment will be described with reference to the flow charts illustrated in FIGS. 8 and 9. FIG. 10 is a view illustrating an exemplary work flow. While FIG. 10 illustrates a simple example of the work flow 7*f*, the work flow is not limited thereto.

In FIG. 10, the work flow 7*f* represents executing a process by the process component a1 (operation S301), subsequently executing a process by the process component b1 (operation S302), and executing a process by the process component b2 (operation S303).

As an example of the work flow 7*f*, a series of processes such as setting a service, acquiring location information of the user terminal 3, and setting a path between the user terminal 3 and the data center 6 may be considered.

An exemplary operation based on the work flow 7*f* of FIG. 10, the component information table 131 of FIG. 6, and the work flow engine information table 132 of FIG. 7 will be described hereinafter. It is assumed that the work flow information table 221, the component information table 231, and the work flow engine information 232 of the work flow engine 830 correspond to the work flow information table 121, the component information table 131 of FIG. 6, and the work flow engine information 132 of FIG. 7, respectively.

Figure 11:
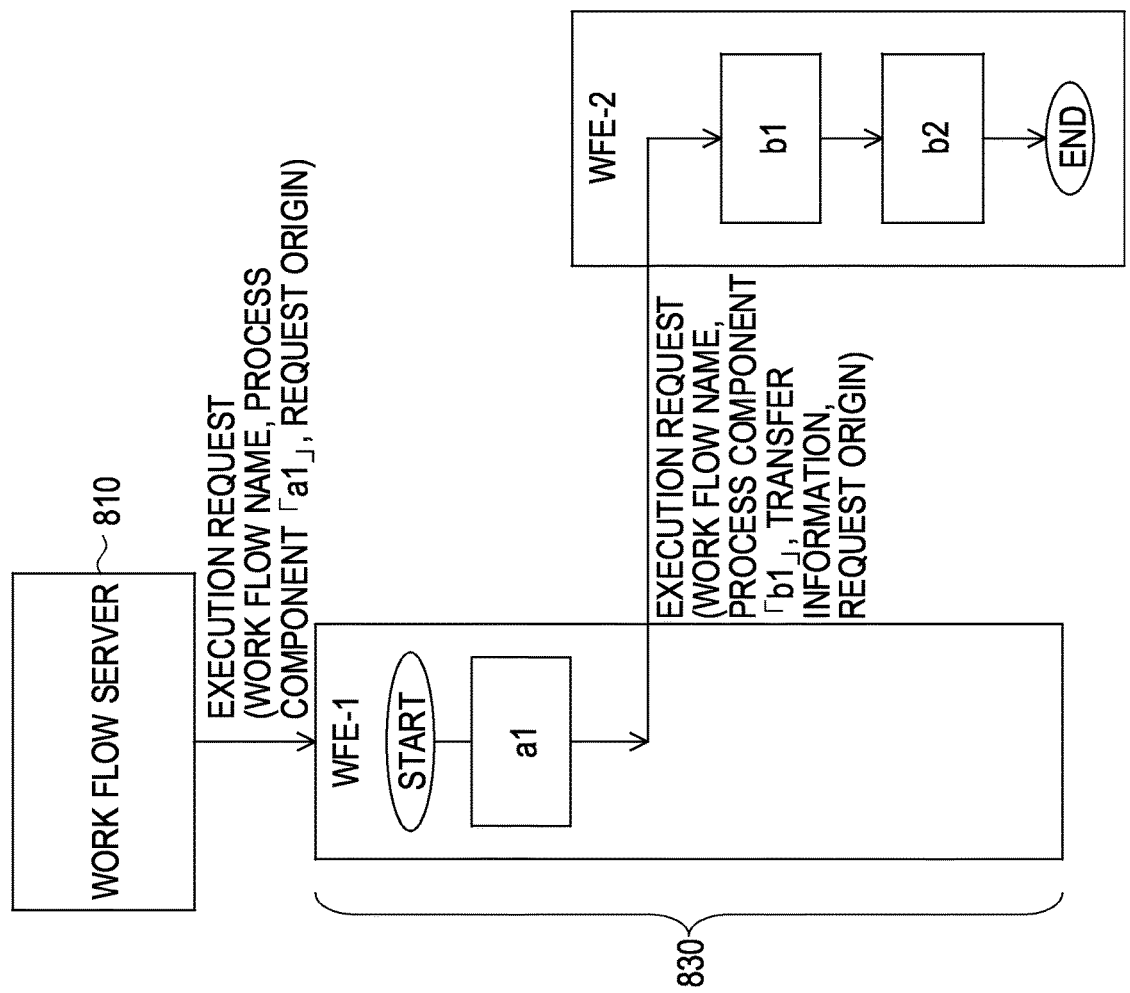
FIG. 11 is a view illustrating an exemplary first operation in an embodiment.

FIG. 11 is a view illustrating an exemplary first operation in the present embodiment. In FIG. 11, in the work flow server 810, upon receiving the execution request from the manager terminal 7, the work flow execution reception unit 120 acquires the work flow data 7*d* describing the work flow 7*f* of the work flow name from the work flow information table 121.

The work flow execution reception unit 120 analyzes the work flow data 7*d* and searches a process component name corresponding to the first process component ID from the component information table 131 so as to acquire a work flow engine name. In the example of FIG. 11, since the first process component name is "a1," the work flow engine names "WFE-1" and "WFE-2" are extracted.

Subsequently, the work flow execution reception unit 120 acquires the work flow engine name "WFE-1" exhibiting the lowest load "10" from the work flow engine names "WFE-1" and "WFE-2" and the access information "IP1" corresponding to the work flow engine name "WFE-1," with reference to the work flow engine information table 132 (FIG. 7).

The work flow execution reception unit 120 prepares an execution request and transmits the prepared execution request to the work flow engine 830 of the work flow engine name "WFE-1" (hereinafter, referred to as the "work flow engine 'WFE-1'") using the access information "IP1" as a reception destination. The execution request includes information such as the work flow name, the process component ID, and the request origin. The process component ID represents "a1," and the request origin represents information such as the address of the work flow server 810.

Among the plurality of work flow engines 830, the selected work flow engine "WFE-1" receives the execution request from the work flow server 810.

In the work flow engine "WFE-1," the work management unit 220 acquires the work flow data 7*d* of the work flow name with reference to the work flow information table 221, and initiates the work flow 7*f* from the process component "a1" designated by the execution request within the work flow data 7*d*. The work management unit 220 starts the work flow execution unit 230 to execute the process component "a1."

When the process by the process component "a1" is finished, the work flow execution unit 230 acquires a subsequent process component ID within the work flow data 7*d*. In this case, the process component "b1" is acquired. Then, the work flow execution unit 230 extracts the work flow engine names "WFE-2" and "WFE-3" associated with the acquired process component "b1" from the component information table 231 (FIG. 6).

Subsequently, the work flow execution unit 230 acquires the work flow engine name "WFE-2" exhibiting the lowest load "20" from the work flow engine names "WFE-2" and "WFE-3," and the access information "IP2" with reference to the work flow engine information table 232 (FIG. 7).

The work flow execution unit 230 prepares an execution request and transmits the prepared execution request to the work flow engine 830 of the work flow engine name "WFE-2" (hereinafter, referred to as the "work flow engine 'WFE-2'") using the access information "IP2" as a reception destination. The execution request includes information such as the work flow name, the process component ID, and the request origin. The process component ID represents "b1," and the request origin represents information such as the address of the work flow engine "WFE-1."

Among the plurality of work flow engines 830, the selected work flow engine "WFE-2" receives the execution request from the work flow engine "WFE-1."

In the work flow engine "WFE-2," the work management unit 220 acquires the work flow data 7d of the work flow name with reference to the work flow information table 221, and initiates the work flow 7f from the process component "b1" designated by the execution request within the work flow data 7d. The work management unit 220 starts the work flow execution unit 230 to execute the process component "b1."

When the process by the process component "b1" is finished, the work flow execution unit 230 acquires a subsequent process component ID within the work flow data 7d. In this case, the process component "b2" is acquired. Then, the work flow execution unit 230 extracts the work flow engine names "WFE-2" and "WFE-3" associated with the acquired process component "b2" from the component information table 231 (FIG. 6).

Subsequently, the work flow execution unit 230 acquires the work flow engine name "WFE-2" exhibiting the lowest load from the work flow engine names "WFE-2" and "WFE-3," and the access information "IP2" with reference to the work flow engine information table 232 (see, e.g., FIG. 7).

Since the work flow engine name "WFE-2" is the same as the work flow engine name of the work flow execution unit 230, the work flow execution unit 230 subsequently executes the process of the process component "b2." When the process of the process component "b2" is finished, the work flow 7f of FIG. 10 is finished.

Subsequently, descriptions will be made on an exemplary second operation in a case where the load value corresponding to the work flow engine name "WFE-2," in the work flow engine information table 132 illustrated in FIG. 7, has been updated to "15" from "40," with reference to FIG. 12.

Figure 12:
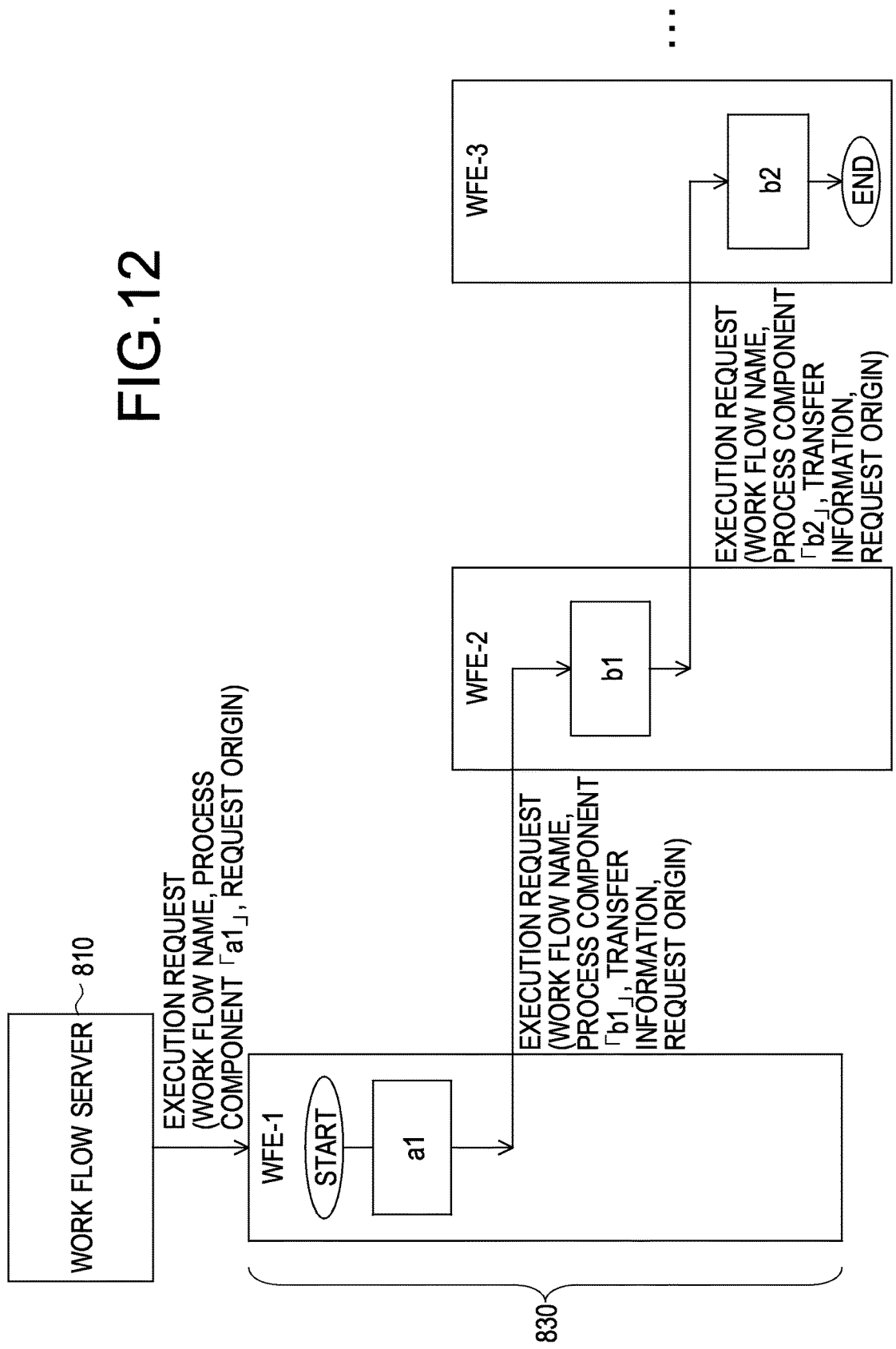
FIG. 12 is a view illustrating an exemplary second operation in an embodiment.

FIG. 12 is a view illustrating an exemplary second operation in the present embodiment. In FIG. 12, the second operation is the same as the exemplary first operation of FIG. 11 until the process by the process component name "a1" is executed in the work flow engine "WFE-1," and the work flow 7f is transferred to the work flow engine "WFE-2" so that the process by the process component name "b1" is executed in the work flow engine "WFE-2." Thus, the descriptions in this regard will be omitted.

In the work flow engine "WFE-2," the work management unit 220 acquires the work flow data 7d of the work flow name with reference to the work flow information table 221, and initiates the work flow 7f from the process component "a1" designated by the execution request within the work flow data 7d. The work management unit 220 starts the work flow execution unit 230 to execute the process component "a1."

When the process by the process component "a1" is finished, the work flow execution unit 230 acquires a subsequent process component ID within the work flow data 7d. In this case, the process component "b1" is acquired. Then, the work flow execution unit 230 extracts the work flow engine names "WFE-2" and "WFE-3" associated with the acquired process component "b1" from the component information table 231 (see, e.g., FIG. 6).

Subsequently, the work flow execution unit 230 acquires the work flow engine name "WFE-3" exhibiting the lowest load "15" from the work flow engine names "WFE-2" and "WFE-3," and the access information "IP3" with reference to the work flow engine information table 232 (see, e.g., FIG. 7).

The work flow execution unit 230 prepares an execution request and transmits the prepared execution request to the work flow engine 830 of the work flow engine name "WFE-3" (hereinafter, referred to as the "work flow engine 'WFE-3'") using the access information "IP3" as a reception destination. The execution request includes information such as the work flow name, the process component ID, and the request origin. The process component ID represents "b2," and the request origin represents information such as the address of the work flow engine "WFE-2."

Among the plurality of work flow engines 830, the selected work flow engine "WFE-3" receives the execution request from the work flow engine "WFE-2."

In the work flow engine "WFE-3," the work management unit 220 acquires the work flow data 7d of the work flow name with reference to the work flow information table 221, and initiates the work flow 7f from the process component "b2" designated by the execution request within the work flow data 7d. The work management unit 220 starts the work flow execution unit 230 to execute the process component "b2."

The work flow execution unit 230 executes the process component "b2," and when the process of the process component "b2" is finished, the work flow 7f of FIG. 10 is finished.

Subsequently, descriptions will be made on an example where a competition of accesses to a specific external system 850 among specific work flow engines 830 can be avoided through the manager terminal 7, by simply changing the component information table 131 illustrated in FIG. 6.

FIG. 13 is a view illustrating an exemplary setting of the component information table to suppress the competition of accesses to an external system. In FIG. 13, the process components "a1," "a2," and "a3" execute processes by using the external system A among the plurality of external systems 850, and the process components "b1," "b2," and "b3" execute processes by using the external system B among the plurality of external systems 850.

The work flow engine information table 132 illustrated in FIG. 6 represents a setting where the process components "a1," "a2," and "a3" related to the external system A are executable by the work flow engines "WFE-1" and "WFE-3." In this case, a competition of accesses to the external system A may occur in the work flow engines "WFE-1" and "WFE-3."

In the present embodiment, in order to suppress the competition of accesses to the external system A, the setting may be changed into a setting where the process components "a1," "a2," and "a3" related to the external system A are associated with the work flow engine "WFE-1" alone, through the manager terminal 7.

The work flow engine information table 132-2 illustrated in FIG. 13 is stored in the work flow server 810. The processes by the process components "a1," "a2," and "a3" related to the external system A are executed by only the work flow engine "WFE-1."

In addition, a work flow information table 221 set in the same manner as that of the work flow engine information table 132-2 is stored in the storage unit 840 of each work flow engine 830. Accordingly, when the processes by the process components "a1," "a2," and "a3" are executed in a work flow engine 830 other than the work flow engine "WFE-1," the work flow engine "WFE-1" and the work flow 7f are transferred by the work flow transfer unit 250.

Therefore, the competition of accesses to the external system A among the work flow engines 830 to execute the process components "a1," "a2," and "a3" related to the external system A may be avoided.

In the present embodiment, first, since each work flow engine 830 is given a process component which can be processed by the work flow engine 830, one work flow 7f may be distributed and processed among the work flow engines 830.

Second, the work flow engine load monitoring unit 130 of the work flow server 810 periodically updates the work flow engine information table 132 and the work flow engine information table 232 of each work flow engine 830.

Third, a designer may design the work flow 7f without regard to the configuration of the plurality of work flow engines 830 in the work flow system 800. Specifically, the work flow data 7d describing a work flow 7f may be prepared, irrespective of the configuration of the plurality of work flow engines 830.

Fourth, since each work flow engine 830 is able to freely operate, the work flow management unit 110 may enable the work flow 7f to be executed by one or more work flow engines 830, by only selecting a work flow engine 830 that at least exhibits a low load with respect to an execution request.

Fifth, during the operation, the manager may easily adjust the allocation of the process components to the work flow engines 830 from the manager terminal 7 by only changing the component information tables 131 and 231, and may tune the loads of the work flow engines 830.

Sixth, when an external system 850 that is unable to accept a plurality of execution requests at once exists, the manager may avoid the access competition among the work flow engines 830 through a simple operation of only changing the component information tables 131 and 231.

With a recent increase of portable terminals such as smart phones, an increase of applications handling various data such as videos, images, and games, or an increase of new-style data communications using, for example, sensors or wearable terminals, the communication service has been required to ensure the communication quality which can respond to the various data communications.

For example, carriers and service providers are required to provide quick and new network services with less investment and operation costs, and furthermore, a structure enabling a quick shift into an easily available network depending on a change of a network use pattern is demanded.

Under the circumstances, it may be said that the application of the present embodiment having the above-described various effects is effective.

The present disclosure is not limited to the embodiment specifically described above, and may be variously changed or modified without departing from the scope of the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A load distribution processing server including a plurality of sub-load distribution processing servers, the load distribution processing server comprising:
a memory;
a processor coupled to the memory and configured to:
receive a first execution request of a work flow, representing an execution sequence of a plurality of process components each configured to perform a processing, by a first sub-load distribution processing server among the plurality of sub-load distribution processing servers;
execute at least one designated process component, among a plurality of process components, designated by the first execution request of the work flow by the first sub-load distribution processing server, to perform at least one processing;
select a second sub-load distribution processing server, having a lowest load among the plurality of sub-load distribution processing servers, to execute at least one undesignated process component that has not been designated by the first execution request of the work flow, from among the plurality of process components excluding the at least one process component designated by the first execution request of the work flow, based on a load condition of the second sub-load distribution processing server and load conditions of third sub-load distribution processing servers, different from the second sub-load distribution processing server, among the plurality of sub-load distribution processing servers capable of processing the at least one undesignated process component; and
when the second sub-load distribution processing server is not the first sub-load distribution processing server, transmit a second execution request of the work flow from the first sub-load distribution processing server to the second sub-load distribution processing server, the second execution request of the work flow including an identifier of the work flow, information of the work flow according to processes executed prior to the at least one undesignated process component, and an identifier of the at least one undesignated process component,
wherein the memory stores a component information table in which the identifier of the at least one undesignated process component is associated with the second sub-load distribution processing server, and
wherein the processor periodically updates the component information table.

2. The load distribution processing server according to claim 1, wherein, when the second sub-load distribution processing server is the first sub-load distribution processing server, the first sub-load distribution processing server executes the at least one undesignated process component after the at least one designated process component.

3. The load distribution processing server according to claim 1, wherein the second sub-load distribution processing server
receives the second execution request, and
executes the at least one undesignated process component identified by the second execution request.

4. The load distribution processing server according to claim 1, wherein the processor
specifies the at least one undesignated process component according to the work flow, and
specifies the second sub-load distribution processing server capable of processing the at least one undesignated process component from among the plurality of sub-load distribution processing servers with reference to the component information table.

5. The load distribution processing server according to claim 4,
wherein the component information table is changed so that a competition of accesses to one of a plurality of external systems by two or more load distribution processing servers capable of processing an identical process component among the plurality of the sub-load distribution processing servers is avoided,
wherein each of the plurality of external systems is connected to at least one sub-load distribution processing server of the load distribution processing server, and
wherein each of the plurality of process components performs the processing using one of the plurality of external systems.

6. A load distribution processing method executed by a load distribution processing server including a plurality of sub-load distribution processing servers, the load distribution processing server including a memory and a processor coupled to the memory, the load distribution processing method comprising:
receiving, by the processor, a first execution request of a work flow representing an execution sequence of a plurality of process components each configured to perform a processing, by a first sub-load distribution processing server among the plurality of sub-load distribution processing servers;
executing, by the processor, at least one designated process component, among the plurality of process components designated by the first execution request of the work flow by the first sub-load distribution processing server, to perform at least one processing;
selecting, by the processor, a second sub-load distribution server having the lowest load among the plurality of sub-load distribution processing servers to execute at least one undesignated process component that has not been designated by the first execution request of the work flow, from among the plurality of process components excluding the at least one process component designated by the first execution request of the work flow, based on a load condition of the second sub-load distribution processing server and load conditions of third sub-load distribution processing servers, different from the second sub-load distribution processing server among the plurality of sub-load distribution processing servers capable of processing the at least one undesignated process component;
when the second sub-load distribution processing server is not the first sub-load distribution processing server, transmitting, by the processor, a second execution request of the work flow from the first sub-load distribution processing server to the second sub-load distribution processing server, the second execution request of the work flow including an identifier of the work flow, information of the work flow according to processes executed prior to the at least one undesignated process component, and an identifier of the at least one undesignated process component;
storing, by the memory, a component information table in which the identifier of the at least one undesignated process component is associated with the second sub-load distribution processing server; and
periodically updating, by the processor, the component information table.

7. A load distribution processing system comprising:
a management server, including:
a first memory, and
a first processor coupled to the first memory and configured to
receive a first execution request of a work flow representing an execution sequence of a plurality of process components, each configured to perform a processing, and
transmit the first execution request to a server capable of processing at least one process component, among the plurality of process components of the work flow, designated by the first execution request of the work flow; and
an execution server, including:
a plurality of sub-execution servers, one of the plurality of sub-execution server being the server capable of processing the at least one process component designated by the first execution request of the work flow;
a second memory; and
a second processor coupled to the second memory and configured to:
receive the first execution request of the work flow by first sub-execution server among the plurality of sub-execution servers,
execute at least one process component, among the plurality of process components, designated by the first execution request of the work flow, by a first sub-execution server to perform at least one processing,
select a second sub-execution server, having the lowest load among the plurality of sub-execution servers, to execute at least one undesignated process component that has not been designated by the first execution request of the work flow, from among the plurality of process components excluding the at least one process component designated by the first execution request of the work flow, based on a load condition of the second sub-execution server and load conditions of third sub-execution servers, different from the second sub-execution server, among the plurality of sub-execution servers capable of processing the at least one undesignated process component, and
when the second sub-execution server is not the first sub-execution server, transmit a second execution request of the work flow from the first sub-execution server to the second sub-execution server, the second execution request of the work flow including an identifier of the work flow, information of the work flow according to processes executed prior to the at least one undesignated process component, and an identifier of the at least one undesignated process component, wherein the second memory stores a component information table in which the identifier of the at least one undesignated process component is associated with the second sub-execution server, and wherein the second processor periodically updates the component information table.

8. The load distribution processing system according to claim 7, wherein the first processor of the management server is further configured to monitor the load conditions of the plurality of sub-execution servers, and transmit data of a table, in which the load conditions of the plurality of sub-execution servers are stored to the plurality of sub-execution servers, respectively.

* * * * *